United States Patent [19]

Matthiessen et al.

[11] Patent Number: 5,664,752
[45] Date of Patent: Sep. 9, 1997

[54] DIRECTION ADJUSTABLE MOUNTING FITTINGS

[75] Inventors: Lars Matthiessen; Ole Jacob Veiergang, both of Aarhus C., Denmark

[73] Assignee: VM Acoustics ApS, Aarhus C., Denmark

[21] Appl. No.: 641,845

[22] Filed: May 2, 1996

Related U.S. Application Data

[63] Continuation of Ser. No. 230,828, Apr. 21, 1994, abandoned.

[30] Foreign Application Priority Data

Apr. 21, 1993 [DK]  Denmark .................................. 0454/93

[51] Int. Cl.$^6$ .................................................. A47F 5/00
[52] U.S. Cl. ...................... 248/299.1; 248/274.1; 248/288.11; 248/279.1
[58] Field of Search ........................ 248/201, 274.1, 248/276.1, 279.1, 285.1, 286.1, 287.1, 288.11, 298.1, 299.1, 220.22, 222.11, 223.21; 411/437; 403/53, 58, 82, 87

[56] References Cited

U.S. PATENT DOCUMENTS

| | | | |
|---|---|---|---|
| 266,446 | 10/1882 | Eager | 248/223.4 |
| 1,212,185 | 1/1917 | Cobb . | |
| 1,242,441 | 10/1917 | Hills . | |
| 1,314,704 | 9/1919 | Ryder | 248/299.1 |
| 1,338,981 | 5/1920 | Levy | 248/299.1 |
| 1,358,159 | 11/1920 | Kern . | |
| 1,578,634 | 3/1926 | Borgmann | 248/299.1 X |
| 1,826,843 | 10/1931 | Thomas | 248/299.1 |
| 2,265,792 | 12/1941 | Allen . | |
| 2,383,104 | 8/1945 | Allen | 248/263 |
| 2,641,513 | 6/1953 | Fryda | 248/288.11 X |
| 2,658,793 | 11/1953 | Sinclair | 248/288.11 X |
| 2,922,609 | 1/1960 | Collier | 248/179 |
| 3,974,994 | 8/1976 | Petterson | 248/23 |
| 4,014,505 | 3/1977 | Dowd | 248/279.1 X |
| 4,068,961 | 1/1978 | Ebner et al. | 403/55 |
| 4,354,654 | 10/1982 | Werner et al. | 248/663 |
| 4,781,347 | 11/1988 | Dickie | 248/183 |
| 4,928,914 | 5/1990 | Snode, II | 248/274 |
| 5,322,255 | 6/1994 | Garrett | 248/299.1 |

Primary Examiner—Leslie A. Braun
Assistant Examiner—Gwendolyn W. Baxter
Attorney, Agent, or Firm—Antonelli, Terry, Stout & Kraus, LLP.

[57] ABSTRACT

A fitting for mounting an object, e.g. a loudspeaker, on a wall comprises two substantially identical saddle strip elements that are laid together in intercrossing positions, top against top, and mutually fixed by means of a clamping bolt through longitudinally extending slots in both elements. The outer strip element, carrying the object to be mounted, may be adjusted in being displaced both in its directions and in the direction of the other element, whereby the object can be mounted with a variety of "directions of irradiation" from the wall and be fixed in a very easy and very stable manner.

10 Claims, 2 Drawing Sheets

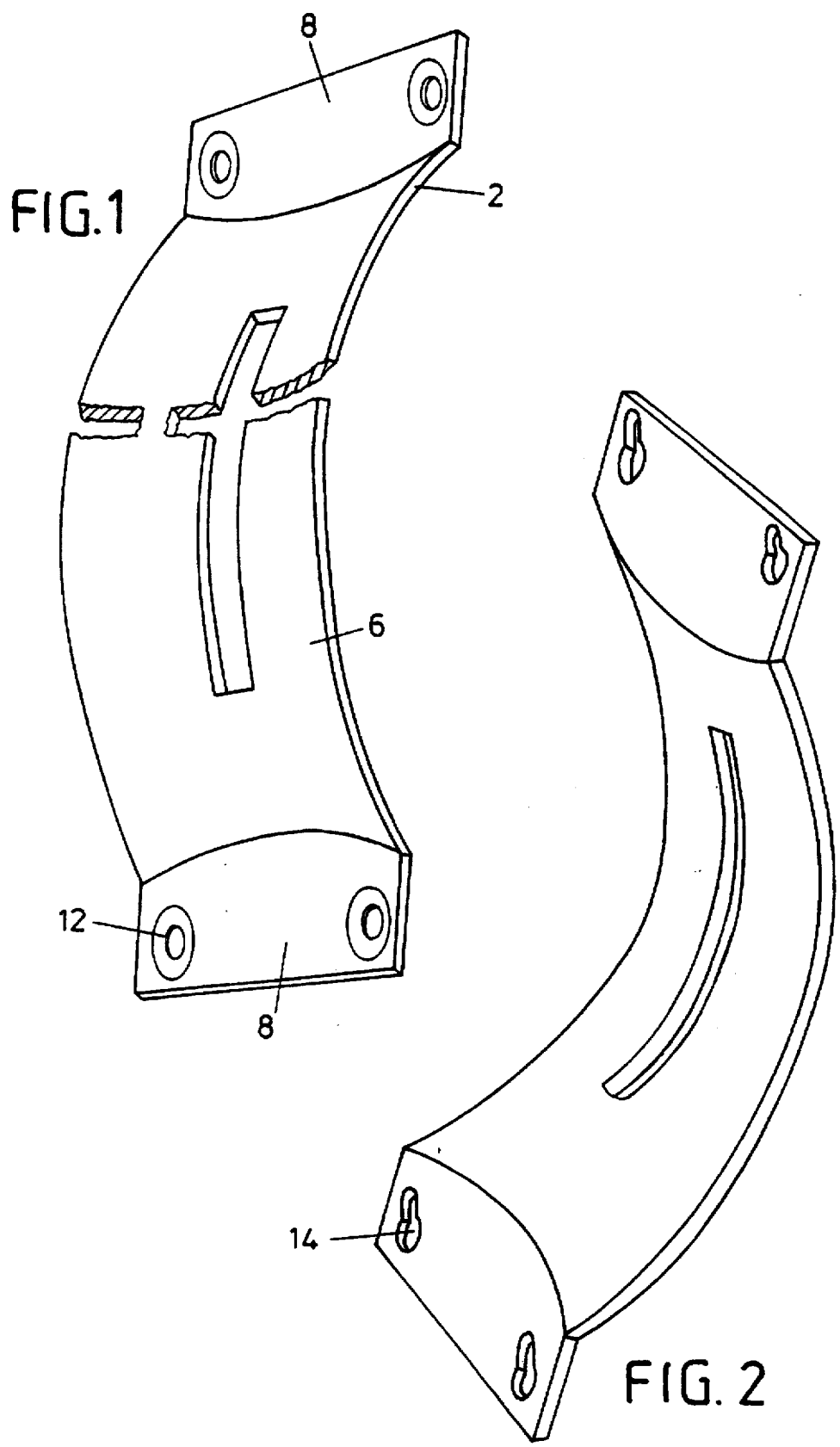

DIRECTION ADJUSTABLE MOUNTING FITTINGS

This application is a Continuation of application Ser. No. 08/230,828, filed Apr. 21, 1994 now abandoned.

TECHNICAL FIELD

The present invention relates to fittings for a direction adjustable mounting of objects such as loudspeakers on a carrier surface such as a wall.

BACKGROUND ART for this purpose, it is possible to use a ball head fitting that will allow the object to be fixed in all possible directions on the ball head, not only with respect to the direction outwardly from the ball head, but also with respect to turning of the object in any actual plane tangential to the ball. In practice this type of mounting, however, is not too attractive, as it can be difficult to hold the object, guided in all directions, while arresting the fitting. Moreover, the ball head fittings are rather expensive to manufacture, if designed with a reasonably descrete appearance and a high total stiffness of the entire fitting.

Probably in most cases it will be sufficient that the object to be mounted, e.g. a loudspeaker, can be secured with a desired direction of irradiation, i.e. pointing up/down and/or to one side, while it will not be desired that the object should also be fixable in different angular positions about this direction. Thus, the sides of a loudspeaker are preferred to be located in vertical planes irrespectively of the loudspeaker pointing upwardly or downwardly and perhaps also obliquely to one side or the other. On this background fittings have already been suggested, comprising only two pivot connections, for adjustment in the vertical and the horizontal plane, respectively. However, even these fittings, which comprise relatively many parts, are relatively expensive to manufacture with the desired high degree of rigidity, and the user has to tighten two connections, which will require some space at each of them, i.e. these fittings will normally appear as rather voluminous units between the object and the mounting surface.

DISCLOSURE OF THE INVENTION

In connection with the invention it has been realized that it is possible to provide a highly simplified and compact fitting, by means of which an object such as a loudspeaker can be mounted with a desired oblique direction relative to a planar support, but without changing its main orientation with respect to the vertical/horizontal disposition.

According to the invention this is achievable in that the entire fitting is made of two fitting parts, which may even be substantially identically shaped, namely as a plate strip element shaped with opposed co-planar end portions having mounting holes for receiving mounting bolts or the like for connection with either an object to be suspended or a carrier surface for that object, and an intermediate strip portion located between said end portions, outwardly arched therefrom and with a cross sectional shape that is concave when viewed from the outside, with a cross sectional curvature slightly bigger than the longitudinal curvature of the intermediate strip portion between the opposed end portions of the two fitting parts. Moreover, each of these parts has a narrow and relatively long, longitudinal slot in their central, arched portion. When the two fitting parts are positioned together, crossing each other perpendicularly with the tops of the arched portions facing each other, this structure can be stabilized by the use of a clamp bolt through the intercrossing longitudinal slots. The abutment area between the fitting parts will be a double curved saddle area, whereby no mutual rotation of the parts can take place about the clamp bolt.

However, with the clamp bolt loosened the fitting parts may slide freely on each other in both of the main directions along the curved surfaces, i.e. the movable fitting part may be displaced both vertically and laterally, with an associated tilting in the vertical and the horizontal plane, respectively. When the desired position is reached the user will tighten the clamp bolt, which will then hold the parts rigidly together, even with a modest clamping force.

For the suspended object it will be characteristic that for an angular displacement in one direction, viz. by a purely longitudinal displacement of the fitting part of the object, the object will tilt about a point located spaced in front of the fitting, viz. in the center of the length curvature of the fitting part. This implies that the object will be displaced in one direction at its rear side, while at its front side it will be displaced in the opposite direction, i.e. the angular adjustment can be accomplished practically without the object changing its position. On the other hand, by adjustments in the cross direction, that is by a transverse displacement of the fitting part of the object relative the fixed fitting part, the displacements of the front and rear sides of the object will take place in the same direction, only with an increased displacement of the front side, whereby the object will change its position. One can hardly speak of special advantages or disadvantages in that connection, but of circumstances which should be considered in determining whether the fixed fitting part should be mounted in a vertical or horizontal position on the carrier surface.

Because of the cross curvature of the fitting parts being slightly bigger than their longitudinal curvature there will be a small distance between the parts at the clamp bolt in the middle of the crossing area, while the active abutment places will be the four crossing points between the outer edges of the two fitting parts, this giving ideal conditions for an efficient clamping together of the parts.

BRIEF DESCRIPTION OF THE DRAWING

In the following the invention is described in more detail with reference to the drawing, in which FIGS. 1 and 2 are perspective views of the two main parts of a fitting according to a referred embodiment of the invention;

BEST MODE FOR CARRYING OUT THE INVENTION

Figure 3:
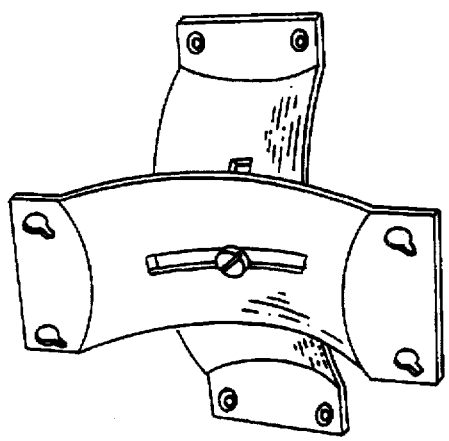
FIG. 3 is a corresponding view of the two parts as positioned together in a symmetrical manner.

The two fitting parts according to FIGS. 1 and 2 are of identical basic shapes. Each consists of a piece of flat iron 2,4, respectively, which is shaped with an arched intermediate portion 6 between flat end portions 8. The intermediate portion 6 is designed with a saddle shaped, double curved shape and has a middle slot 10 extending in the longitudinal direction. The curvature in the cross direction is slightly bigger than the longitudinal curvature. The end portions 8 are provided with holes, which in FIG. 1 are simple, though perhaps countersunk holes 12, while in FIG. 2 the corresponding holes 14 are made like key holes.

Figure 4:
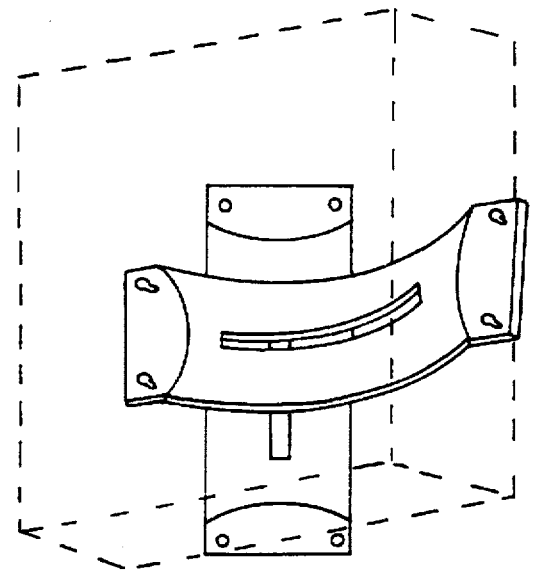
FIG. 4 is a front view of the fitting with the parts positioned together in an asymmetrical manner.
Figure 5:
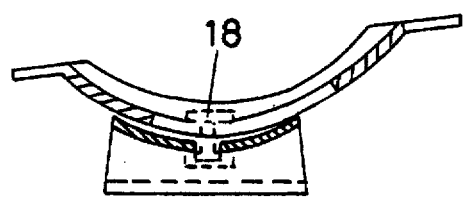
FIGS. 5 and 6 are respective top and side views thereof.
Figure 6:

In FIG. 3 it is shown that the fitting part 2 is mounted as a wall held member with vertical orientation, while in FIGS. 4 and 5 the fitting part 4 is used as an object fitting member secured to an object 16 such as a loudspeaker shown in dotted lines. The fitting parts are positioned in the illustrated intercrossing manner with their arch tops facing each other, and a clamp bolt 18 is mounted through the crossing slots 10 as illustrated in FIG. 5. The bolt is tightened, if the the object is wanted to be mounted in this normal position, i.e. in parallel with the wall. However, it will easily be appreciated that the outer fitting part 4 will not be bound to assume this position, inasfar as it is displaceable, prior the the bolt 18 being tightened, in two different directions, viz. partly in its own longitudinal direction, which will result in a lateral tilting of the object 16, and partly in its cross direction, along the fitting part 2, resulting in a tilting up or down of the object 16 depending of the displacement taking place upwardly or downwardly.

Upon the desired position being reached the fitting can be fixed just by tightening the bolt 18, optionally after a fine adjustment of the position with the bolt not fully tightened. At the rear of the fitting parts there will be sufficient space for tightening the bolt with the fingers or with a laterally introduced key, but generally it will easier to first fix the fitting and then hook- mount the object 16.

Once the wall fitting part 2 has been mounted with vertical orientation and the object fitting part 4 has been mounted on the object with horizontal orientation it will be ensured that the lateral sides of the object will always be located in vertical planes, no matter in what positions the fitting is assembled or reassembled after adjustment. Owing to the double curved engagement between the fitting parts, the object fitting part 4 will be absolutely bound to extend perpendicular across the wall part 2, irrespective of the said possible tiltings by the mounting. The joined fitting will have the character of a totally stiff unit, as also the fitting parts themselves, with their double curved shape, are extremely stiff.

The keyhole-like holes 14 in the fitting part 4 should be seen in connection with the object 16 only being shown in dotted lines. It may be a preferred option to prepare the object, prior to its mounting, with screws that will later on enable a simple hooking-on of the object on the fitting, when the latter has been fixed under free access to the bolt 18. The narrow portions of the keyholes are obliquely downwardly directed, viz. for making it possible that the same fitting can be mounted with the wall fitting part horizontal and thus the object part vertical, whereby the latter part may then again be oriented such that the keyhole portions extend inclined downwardly. Besides, the opposed edges of these portions are countersunk with edge surfaces that are outwardly inclined from a depressed location at the broad part of the keyholes, such that the after-mounted object can be displaced into a firm wedge engagement at the screws; thereby the after-mounting will be easy to effect for a firm holding without any kind of after-tightening.

It should be noted that in oblique positions of the object 16 it could be considered to mount the fitting parts more or less turned out from the vertical/horizontal orientation, but inasfar as this will not affect the fitting itself it is deemed unnecessary to describe it further.

It should be mentioned that, as an alternative it will be possible to join the elements with the outer element located innermost in the joint. However, if the elements, shaped as described above, are joined in this manner, the joint will be staggering because the elements will touch each other only immediately at the clamping bolt. In a fitting for that kind of mounting the longitudinal curvature of the elements should, to the contrary, be bigger than the transverse curvature.

If a displacement adjustment is desired in only one direction, one of the elements may have a hole instead of a slot.

Preferably, as shown, the slots extend along the middle line of the saddle elements, but they could well be offset therefrom.

While it is highly advantageous that the two elements of the fitting are practically identical, they may well be of different sizes and curvatures, preferably as long as it is ensured that they, when clamped together, will abut each other by the said four point engagement.

The means for clamping the elements together will not be limited to the bolt through the slots, as some kind of external clamping means surrounding the crossing area may be used, though of course in a less elegant manner.

We claim:

1. A fitting for directionally and adjustably mounting an object on a carrier surface comprising:

first and second rigid fitting parts, each rigid fitting part being shaped with a plate strip portion having a first side and a second side opposite to said first side, the plate strip portion being oblong so as to have a length dimension and a width dimension, the strip portion extending in a longitudinal direction so as to be convexly curved at the first side and correspondingly concavely curved at the second side, and extending in a width direction so as to be concavely curved at the first side and correspondingly convexly curved at the second side, said plate strip portion thus forming a geometrical saddle element;

the oblong plate strip portions having at both ends thereof a mounting portion for attachment of the first and second rigid fitting parts to the carrier surface and the object to be mounted, respectively, with the oblong plate strip portions bulging outwardly therefrom; and a clamp for clamping the two oblong plate strip portions together into orthogonal intercrossing positions thereof at selected respective subareas along the longitudinal direction thereof, such that in the subareas the intercrossing positions curving in the width direction of each of the oblong plate strip portions will substantially mate with the curving in longitudinal direction of another oblong plate strip portion to thereby produce a clamping by which a relative rotation and displacement of the oblong plate strip portions is prevented.

2. A fitting according to claim 1, wherein:

the clamp comprises a clamping bolt extending through a longitudinally oriented slot in one of the oblong plate strip portions and a hole in another of the oblong plate strip portions.

3. A fitting according to claim 2 wherein:

the hole in the other oblong plate strip portion is also a longitudinally oriented slot.

4. A fitting according to claim 3, wherein:

the slot in the oblong plate strip portion of both the first and the second rigid fitting parts are placed at the middle of the respective oblong plate strip portions.

5. A fitting according to claim 1 wherein:

the oblong plate strip portion extends with a first curvature in the longitudinal direction and a second curvature in the width direction, the second curvature being either bigger or smaller than said first curvature.

6. A fitting according to claim 1 wherein:

the mounting portion at opposite ends of each of the first and second rigid parts comprises co-planar end plate portions.

7. A fitting according to claim 6 wherein:

at least one of the first and second rigid parts has keyhole shaped holes in the end plate portions.

8. A fitting according to claim 7 wherein:

the keyholes have a maximum dimension extending in a direction which is oblique to the longitudinal axis of the first and second rigid parts, when the first and second rigid parts are mounted with the plate strip portions thereof orthogonally intercrossing.

9. A fitting according to claim 7 further comprising:

edge areas of a stem portion of the keyhole shaped holes in the mounting portion are countersunk in a face opposite a mounting face for attachment to the carrier surface and have an increasing thickness towards a narrow end of the stem portion.

10. A fitting according to claim 1 wherein:

the first and second rigid parts are shaped identically with respect to a shape of the oblong plate strip portions thereof and slots therein.

* * * * *